No. 821,270. PATENTED MAY 22, 1906.
G. P. WHITE.
MOLDING MACHINE.
APPLICATION FILED AUG. 19, 1905.

5 SHEETS—SHEET 1.

WITNESSES:
N. C. Abbott
A. E. Fay

INVENTOR
George P. White
BY
Munn
ATTORNEYS

No. 821,270.

PATENTED MAY 22, 1906.

G. P. WHITE.
MOLDING MACHINE.
APPLICATION FILED AUG. 19, 1905.

Fig. 2.

WITNESSES:
A. C. Abbott
A. E. Fay

INVENTOR
George P. White
BY
ATTORNEYS

No. 821,270. PATENTED MAY 22, 1906.
G. P. WHITE.
MOLDING MACHINE.
APPLICATION FILED AUG. 19, 1905.

5 SHEETS—SHEET 3.

WITNESSES:
M. C. Abbott
A. E. Fay

INVENTOR
George P. White
BY
Munn
ATTORNEYS

No. 821,270. PATENTED MAY 22, 1906.
G. P. WHITE.
MOLDING MACHINE.
APPLICATION FILED AUG. 19, 1905.

5 SHEETS—SHEET 4.

WITNESSES:
M. C. Abbott
A. E. Fay

INVENTOR
George P. White
BY
ATTORNEYS

No. 821,270. PATENTED MAY 22, 1906.
G. P. WHITE.
MOLDING MACHINE.
APPLICATION FILED AUG. 19, 1905.

5 SHEETS—SHEET 5.

WITNESSES:
R. C. Abbott
A. E. Fay

INVENTOR
George P. White
BY
ATTORNEYS

ANDREW. B. GRAHAM CO., PHOTO-LITHOGRAPHERS, WASHINGTON, D. C.

UNITED STATES PATENT OFFICE.

GEORGE PATCHETT WHITE, OF WALLACE, IDAHO.

MOLDING-MACHINE.

No. 821,270.

Specification of Letters Patent.

Patented May 22, 1906.

Application filed August 19, 1905. Serial No. 274,925.

*To all whom it may concern:*

Be it known that I, GEORGE PATCHETT WHITE, a citizen of the United States, and a resident of Wallace, in the county of Shoshone and State of Idaho, have invented a new and Improved Molding-Machine, of which the following is a full, clear, and exact description.

My invention relates to a machine for molding concrete blocks of all descriptions—such as building-blocks, foundations, chimney-flues, flooring, and the like—and, in fact, for molding any articles which can be made of plastic materials.

The invention has for a general object the location of the several parts of a press in such convenient positions as to enable the operator to produce molded articles with the greatest convenience and speed and to remove them from the machine in a ready and efficient manner.

Further objects of the invention relating in a large measure to the general object mentioned above will appear below.

Reference is to be had to the accompanying drawings, forming a part of this specification, in which similar characters of reference indicate corresponding parts in all the figures.

Figure 1:
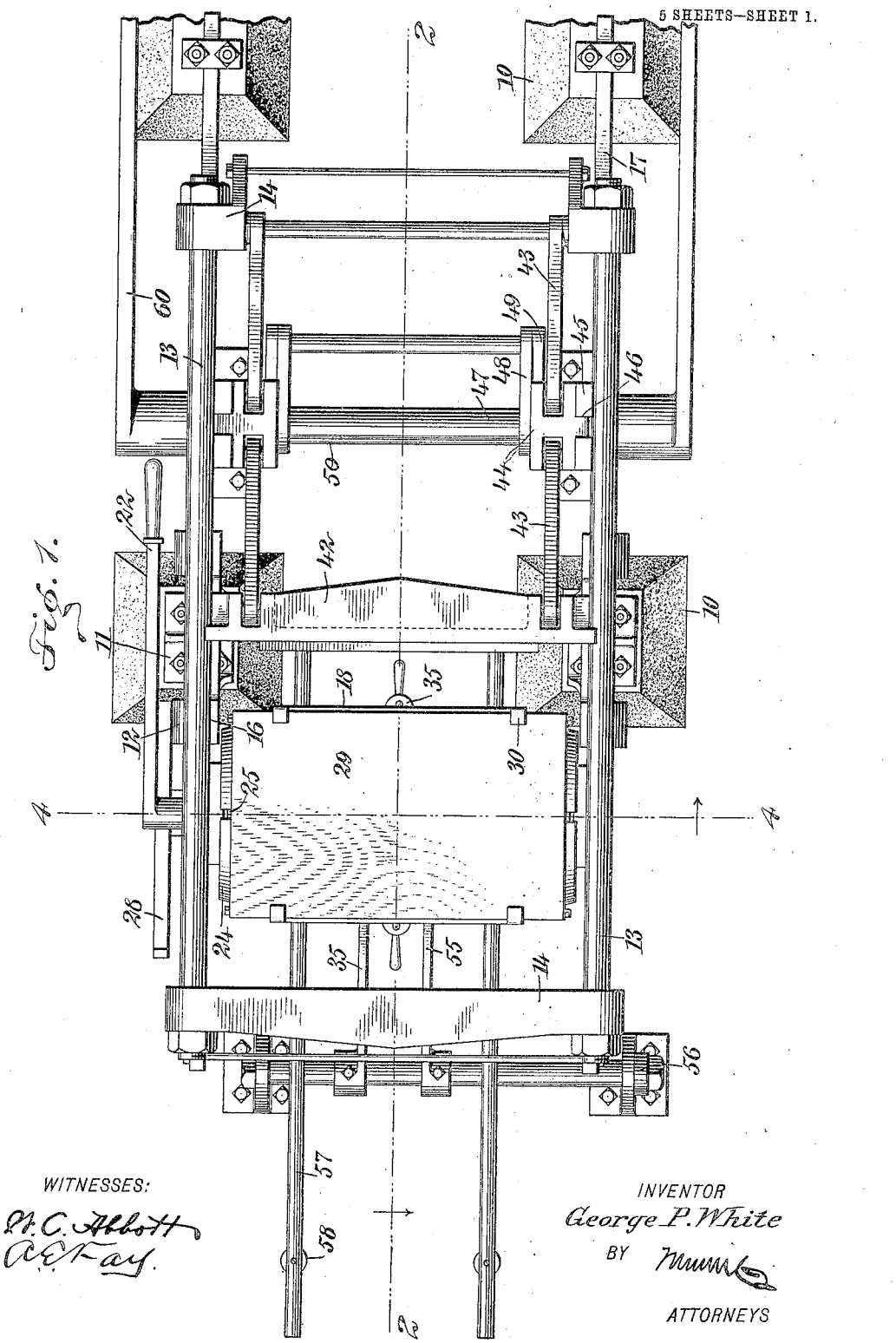
Figure 3:
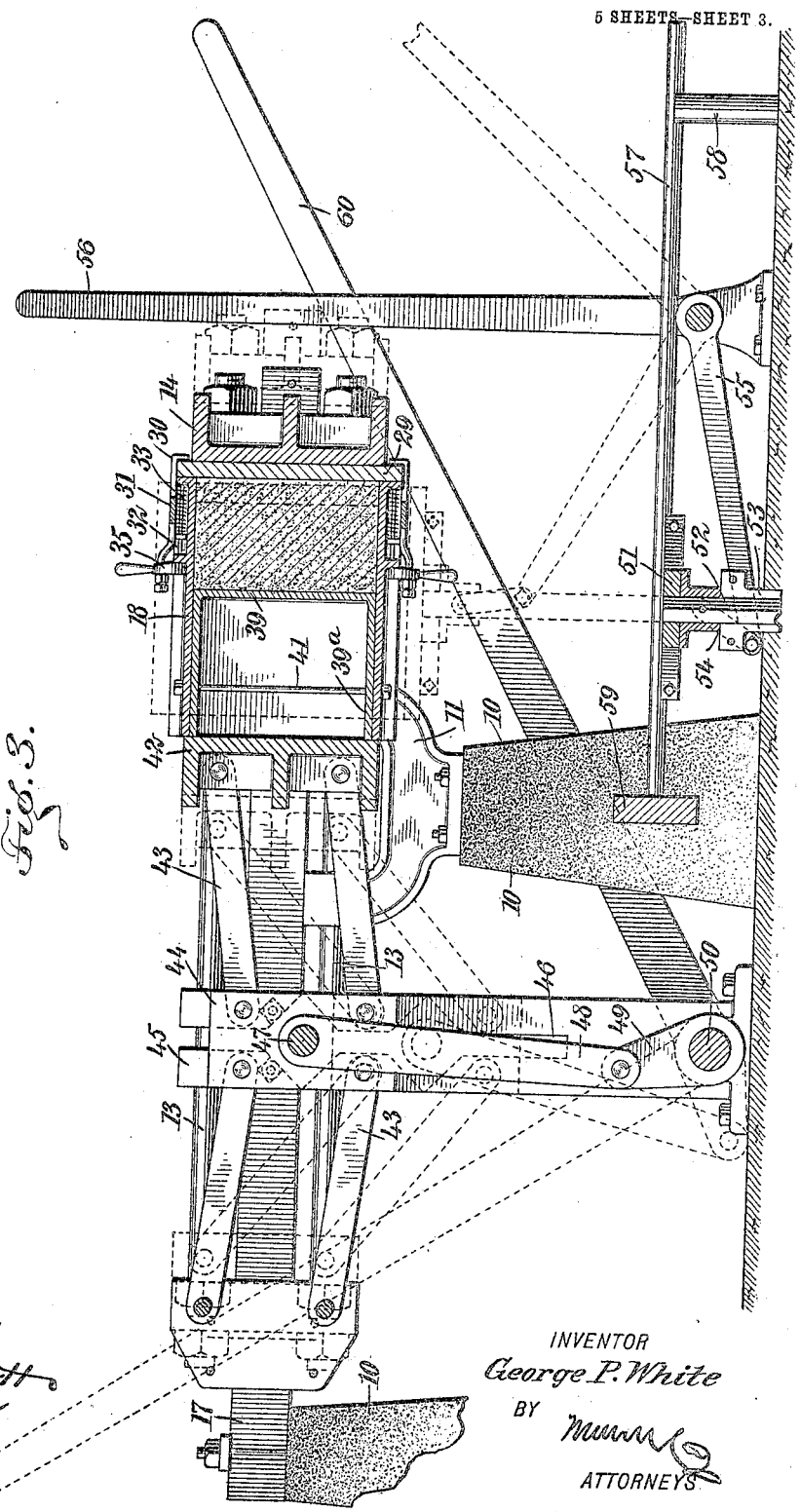
Figure 4:
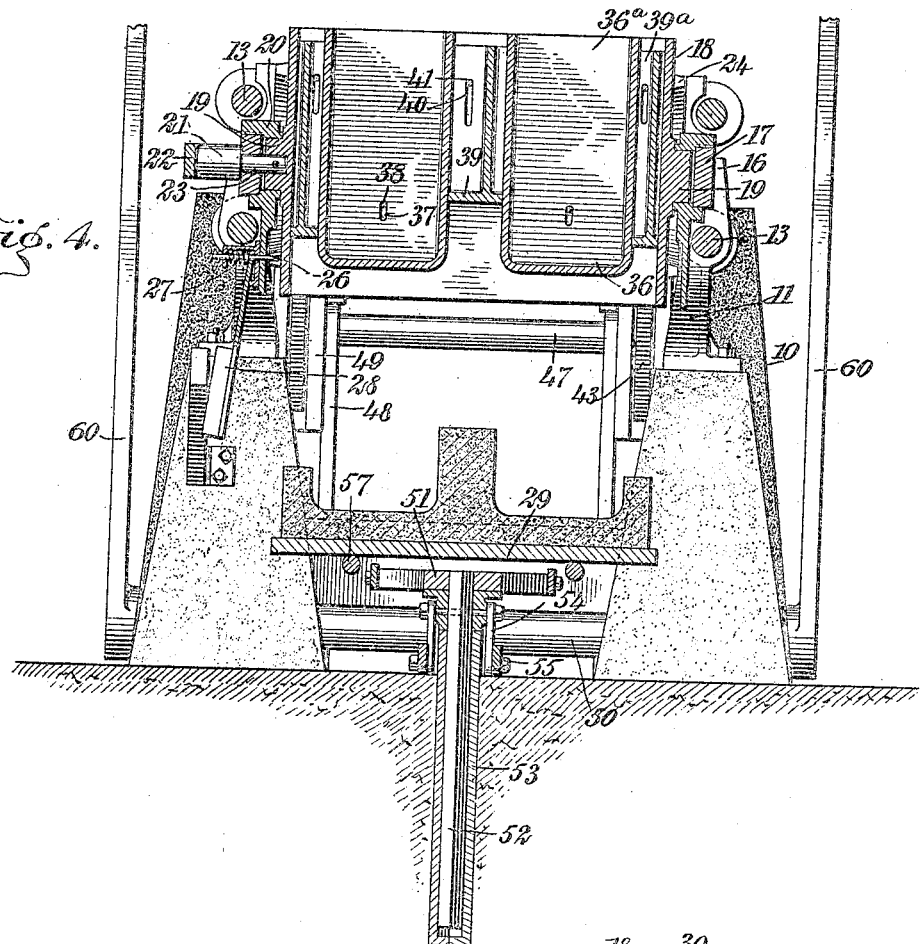
Figure 5:
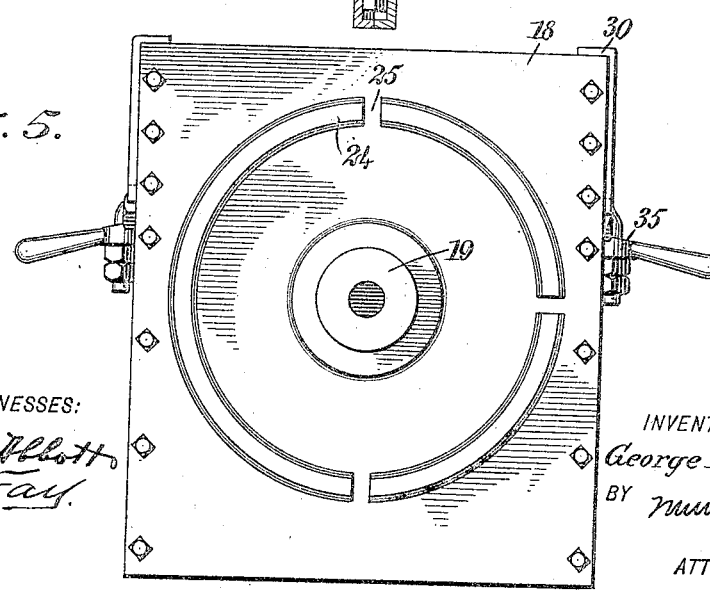
Figure 6:
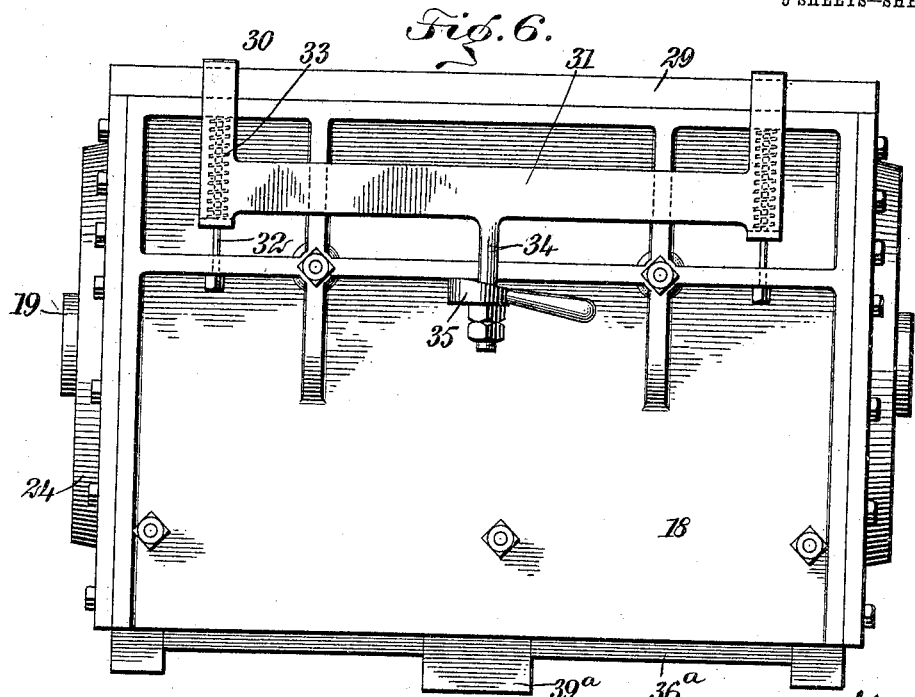
Figure 7:
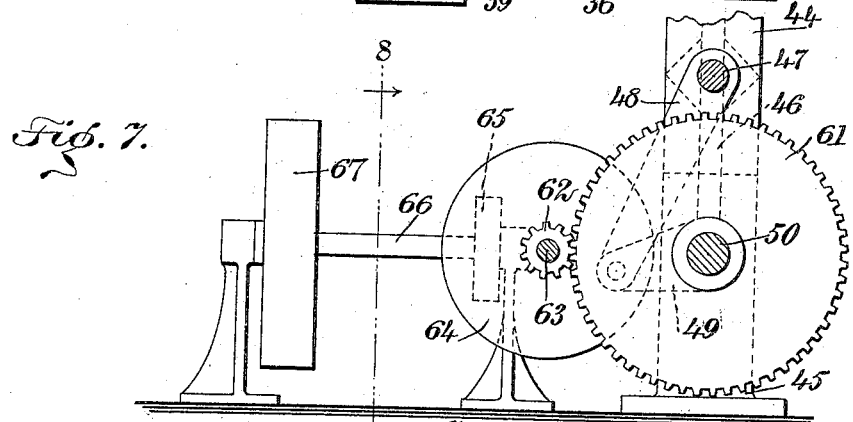
Figure 8:
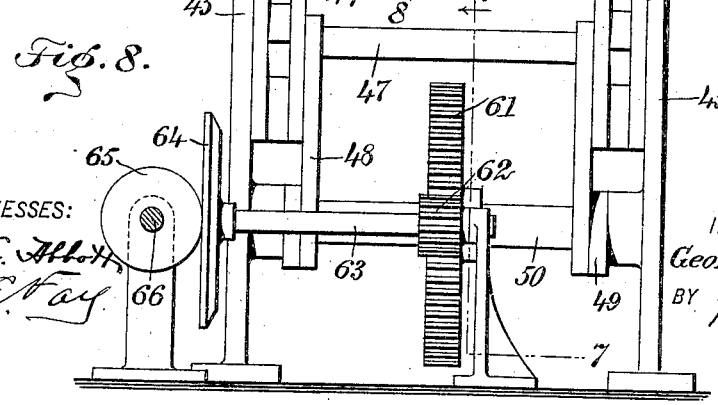

Figure 1 is a plan of a machine embodying the principle of my invention. Fig. 2 is a sectional view on the line 2 2 of Fig. 1, showing the parts in the position occupied when the mold has been filled with plastic material. Fig. 3 is a sectional view on the same line, showing the parts in the position occupied after the plastic material has been compressed. Fig. 4 is a sectional view on the line 4 4 of Fig. 1. Fig. 5 is an end elevation of the mold shown in the other views. Fig. 6 is a side elevation of the same. Fig. 7 is a sectional view on the line 7 7 of Fig. 8, showing a means of operating the machine by power; and Fig. 8 is a sectional view on the line 8 8 of Fig. 7.

The machine is preferably supported by a series of standards or pillars 10, which may be formed of concrete or similar material. Two of these pillars support chairs 11, each having a bearing 12 for receiving a longitudinal rod 13. There are two of these rods on each side of the machine, one above the other, the upper one not being directly connected with the chairs 11. These rods are connected together by heads 14, mounted on their opposite ends and secured to the rods by nuts 15 in adjusted positions. The chairs 11 are provided with projections 16, which support a pair of upright bars 17, these bars being supported also at one end by the other pillars 10. These parts constitute the main supporting-frame for the machine. They also constitute supports for a mold 18, which will now be described.

The mold is provided with trunnions 19 on its opposite ends, mounted off center, so as to balance the mold when filled. These trunnions are mounted to turn in a frame 20, which projects over the bar 17 and is supported thereby. One of the trunnions is provided with a stud 21, with which a handle 22 is rigidly connected for inverting the mold. One of the bars 17 is provided with a perforation 23 for receiving this stud.

In order to provide for holding the mold in any desired position about its axis, one end thereof is provided with a circular ledge 24, having recesses 25 for the reception of a pin 26. This pin is normally pressed against the ledge or into a recess by a spring 27, and a knee-lever 28 is provided for moving the pin out of the recess and allowing the mold to be turned. The mold is intended to be used with a pallet 29 and is provided with hooks 30 for holding the pallet in place. These hooks on each side of the mold are connected by a cross-bar 31 and are provided with guide-pins 32. Springs 33 surround the guide-pins and normally force the hooks out of operative position. The cross-bar 31 is provided with an arm 34, which is screw-threaded at the end, and a cam-nut 35 is mounted on this arm for moving the cross-bar and forcing the hooks into intimate contact with the pallet, so as to hold the latter securely to the mold.

I have shown the mold as being provided with cores 36, movably mounted and having slots 37 for receiving cross-pins 38 to guide the cores and limit their movement. I have also shown a plate 39 in the mold surrounding the cores, the plate being provided with slots 40 for receiving pins 41, similar to the pins 38. The pins 38 and 41 extend through the mold and hold the opposite sides thereof together in addition to serving as guides for the core and press-plate 39. The press-plate may be considered as a part of the core and may have two or more surfaces in different planes, in which case it is, properly speaking, a core. The press-plate and the core are both provided with skirts $36^a$ and $39^a$, which extend normally to the rear of the mold, beyond the outer surface thereof. The skirts are of different lengths, so that when a flat surface is brought against their projecting ends they will be forced into the mold and assist in the compression of the material therein. On account of the different lengths of the skirts the cores 36 will be pressed into the mold a certain distance to the limit which is necessary in order to produce the desired configuration. During this time the plate 39 is also forced into the mold; but on account of its skirt projecting farther than the skirt 36ª it will also have been forced in before the movement of the cores 36 has commenced. This will provide for a greater compression of the material between the press-plate and the other side of the mold than is given to that between the ends of the cores and the other side of the mold. This is desirable on account of the greater thickness of material adjacent to the surfaces of the plate 39. It will be noticed that the slots 37 and 40 are parallel with each other and that the latter are longer than the former, thus allowing the difference in motion between the two elements described.

After the mold is filled and the pallet placed in position, as shown in Fig. 2, the mold is tilted over into the position shown in Fig. 3 and pressure is applied through a press-head 42. This press-head is mounted to slide upon the bars 17, being guided thereby in an obvious manner. The press-head and one of the end heads 14 are pivotally connected with links 43. These links in turn are pivoted to a cross-head 44, which slides vertically in a standard 45, having a vertical slot 46. The cross-head is provided with a shaft 47, connected with a link 48, that in turn is connected with an arm 49, mounted on a main shaft 50. The oscillation of this shaft will operate the lever-toggle formed by the link 48 and arm 49 to lift the cross-head 44 and act on the press-heads 14 and 42 through the instrumentality of the toggles 43. It will thus be seen that a double toggle is provided for effecting the pressure on the molding material. After the molding operation is completed the press-heads are moved back and the mold inverted, so that the pallet is on the bottom.

I have provided means for removing the molded article from the mold, this means comprising a platform or skeleton frame 51, mounted on a vertically-sliding rod 52, operating in bearings 53. A link 54 is connected with the table or frame 51, and this in turn is connected with a bell-crank 55. This bell-crank has a handle 56, by means of which the table can be lifted. The table is located to move upwardly between a pair of rods 57, which constitute a skeleton frame for receiving the pallet from the table when the table is lowered below it. These rods are supported by a standard 58 and a crossbar 59 on two of the pillars 10. By the manipulation of the handle 56 the table can be raised to the position shown in dotted lines in Fig. 3, and the pallet being released from the mold after the mold is turned over will rest on the table, and it can then be lowered, taking the molded article with it. As the table moves below the upper surfaces of the rods 57 the pallet will be deposited on the latter and can be removed therefrom by any desired kind of a lifting device or by hand.

In the first four figures I have shown a lever 60 on the shaft 50 for operating the machine; but in Figs. 7 and 8 I have shown means for operating the shaft by power, comprising a gear 61 on the shaft, a pinion 62 meshing with the gear and mounted on a shaft 63, a disk 64, mounted on the shaft 63, and a second disk 65, engaging the disk 64, and transmitting power thereto. The disk 65 is mounted on a counter-shaft 66, which receives power from a pulley 67 or the like.

Having thus described my invention, I claim as new and desire to secure by Letters Patent—

1. A molding-machine comprising a pair of heads, a movable press-head mounted between them, a toggle connecting said movable press-head with one of the first-mentioned heads, a cross-head connected with said toggle, and a toggle for operating said cross-head.

2. A molding-machine comprising a pair of heads, a movable press-head mounted between them, a toggle connecting said movable press-head with one of the first-mentioned heads, a cross-head connected with said toggle, a toggle for operating said cross-head, a shaft with which one member of the second toggle is rigidly connected, and means for oscillating the shaft.

3. In a molding-machine, the combination of a series of pillars or supports, chairs located on certain of said pillars, a rod supported by each chair, a pair of bars supported by others of said pillars in a position parallel to said rods, a head mounted on said rods, a second head movably mounted on said bars, means for forcing said second head away from the first head, a third head adjustably mounted on the rods, and an invertible mold mounted between the second and third heads.

4. In a molding-machine, the combination of a series of pillars or supports, chairs located on certain of said pillars, a rod supported by each chair, a pair of bars supported by others of said pillars in a position parallel to said rods, a head mounted on said rods, a second head movably mounted on said bars, means for forcing said second head away from the first head, a third head adjustably mounted on the rods, an invertible mold mounted between the second and third heads, said mold being mounted on trunnions located off center to balance the mold when filled with plastic material, and means on one of said trunnions for turning the mold.

5. In a molding-machine, the combination of a frame having horizontal guides, a press-head movable along said guides, a mold mounted between said guides and provided with trunnions, a plate for receiving said trunnions mounted on the guides, means on one of the trunnions for turning the mold about the trunnions as a center, and a stop-pin for the mold, said mold having recesses for receiving said stop-pin.

6. In a molding-machine, the combination of a frame having horizontal guides, a press-head movable along said guides, a mold mounted between said guides and provided with trunnions, a plate for receiving said trunnions mounted on the guides, means on one of the trunnions for turning the mold about the trunnions as a center, and a stop-pin for the mold, said mold having recesses for receiving said stop-pin, said recesses being located at an angle of ninety degrees to each other to provide for holding the mold in normal position, in inverted position, and on its side.

7. In a molding-machine, the combination of a mold provided with trunnions, a plate for receiving and supporting said trunnions, means on one of the trunnions for turning the mold about the trunnions as a center, and a stop-pin for the mold, said mold having recesses for receiving said stop-pin, and the recesses being located at an angle of ninety degrees to each other with respect to the center of the trunnion in order to provide for holding the mold in normal position, in inverted position, and on its side.

8. In a molding-machine, the combination of a mold provided with trunnions, a plate for supporting said trunnions, means for turning the mold about the trunnions as a center, and a stop-pin for the mold, said mold having recesses for receiving said stop-pin.

9. A molding-machine, comprising a mold having trunnions and a circular ledge on the end of the mold concentric with said trunnions and having a series of recesses, and a stop-pin adapted to enter the recesses in said ledge for holding the mold in different positions.

10. A molding-machine, comprising a frame, a mold mounted on trunnions on said frame, a stop-pin for said mold, a circular ledge on the end of the mold concentric with said trunnions, said ledge having a series of recesses for receiving said stop-pin, and a knee-lever for operating said stop-pin.

11. A molding-machine, comprising a frame, a mold mounted on trunnions on said frame, a stop-pin for said mold, and a circular ledge on the end of the mold concentric with said trunnions, said ledge having a series of recesses for receiving said stop-pin, said mold being provided with a movable core.

12. A molding-machine having an invertible mold provided with a plurality of core parts mounted to reciprocate different distances in the mold.

13. A molding-machine, comprising a mold having a core reciprocatingly mounted therein, and means for limiting the extent of reciprocation of said core, a reciprocable press-plate for operating the said core, and means for limiting the motion of said press-plate, the latter means giving a greater latitude of motion than the former means.

14. A molding-machine, comprising a mold having two bars, a core in the mold having a slot through which one of said bars passes, and a press-plate having a slot through which the other bar passes, said bars serving as stops for limiting the motion of the core and press-plate.

15. A molding-machine, comprising a mold having two series of bars extending across it, a core in the mold having a slot through which one of said bars passes, and a press-plate in the mold coöperating with the core and having a slot through which the other bar passes, said second slot being longer than the first.

16. A molding-machine, comprising a mold having two series of bars extending across it, a core in the mold having a slot through which one of said bars passes, and a press-plate in the mold coöperating with the core and having a slot through which the other bar passes, said second slot being longer than the first, said slots being parallel with each other.

17. A molding-machine having a mold provided with a core, and a press-plate, said core and press-plate each being provided with a skirt normally extending beyond the rear side of the mold.

18. A molding-machine having a mold provided with a core, and a press-plate, said core and press-plate each being provided with a skirt normally extending beyond the rear side of the mold, the skirt of the press-plate extending farther from the surface of the mold than that of the core, the press-plate being provided with a perforation for receiving the core.

19. In a molding-machine, the combination of a frame, a mold mounted thereon, means for inverting the mold, a reciprocable core and a reciprocable press-plate in said mold, said press-plate having a perforation through which the core passes, and a platform adapted to be moved under the mold and to receive the molded article therefrom, the core and press-plate being adapted to descend a certain distance with the molded article as it is removed from the mold.

20. In a molding-machine, the combination of a mold, means on the mold for holding a pallet thereon, and means for releasing the pallet, comprising a hook movably mounted on the mold for engaging the pallet, resilient means for forcing the hook away from the pallet, and positive means for forcing the hook against the pallet.

21. In a molding-machine, the combination of an invertible mold, a platform mounted below said mold, means for raising the platform to a position adjacent to the bottom of the mold and for lowering the platform from the mold, means on the mold for holding a pallet on the top thereof, and means for releasing the pallet when the mold is inverted to deposit the pallet on said platform; said last-named means comprising a hook movably mounted on the mold for engaging the pallet, a spring for forcing the hook away from the pallet, and a cam for forcing the hook against the pallet.

22. In a molding-machine, the combination of a movable mold, a platform movably mounted below the mold, means for reciprocating the platform toward and from the mold, and a frame consisting of a pair of bars between which said platform is adapted to move, said bars being at such a distance apart as to admit the passage of the platform but to arrest the passage of the mold.

In testimony whereof I have signed my name to this specification in the presence of two subscribing witnesses.

GEORGE PATCHETT WHITE.

Witnesses:
B. F. O'NIEL,
J. M. McCLEAR.